(12) United States Patent
Akiyama et al.

(10) Patent No.: US 6,430,594 B1
(45) Date of Patent: Aug. 6, 2002

(54) REAL-TIME OPERATING SYSTEM AND A TASK MANAGEMENT SYSTEM THEREFOR

(75) Inventors: Masako Akiyama, Tokyo; Yuji Fujiwara, Kanagawa, both of (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/024,139

(22) Filed: Feb. 17, 1998

(30) Foreign Application Priority Data

Feb. 17, 1997 (JP) ............................................... 9-31930

(51) Int. Cl.[7] ................................................ G06F 9/00
(52) U.S. Cl. ...................................... 709/108; 709/102
(58) Field of Search ................................ 709/100, 107, 709/108, 102, 104

(56) References Cited

U.S. PATENT DOCUMENTS

| | | | | |
|---|---|---|---|---|
| 5,613,114 A | * | 3/1997 | Anderson et al. | 709/108 |
| 5,640,563 A | * | 6/1997 | Carmon | 709/102 |
| 5,727,211 A | * | 3/1998 | Gulsen | 709/108 |
| 6,052,707 A | * | 4/2000 | D'Souza | 709/106 |
| 6,105,048 A | * | 8/2000 | He | 709/100 |

FOREIGN PATENT DOCUMENTS

| | | |
|---|---|---|
| JP | 62-266625 | 11/1987 |
| JP | 62266625 | 11/1987 |
| JP | 1-181130 | 7/1989 |
| JP | 1181130 | 7/1989 |
| JP | 4-367942 | 12/1992 |
| JP | 4367942 | 12/1992 |
| JP | 5127926 | 5/1993 |
| JP | 5-127926 | 5/1993 |
| JP | 6-67899 | 3/1994 |
| JP | 6067899 | 3/1994 |
| JP | 8-83189 | 3/1996 |
| JP | 8083189 | 3/1996 |
| JP | 9319597 | 12/1997 |
| JP | 9-319597 | 12/1997 |

OTHER PUBLICATIONS

Japanese Office Action issued Jun. 2, 1999 in a related application and English–language translation of relevant portions.
Japanese Office Action issued Oct. 27, 1999 in a related application and English–language translation of relevant portions.
Japanese Office Action issued Jun. 2, 1999 in a related application and English–language translation of relevant portions.
Japanese Office Action issued Oct. 27, 1999 in a related application and English–language translation of relevant portions thereof.

* cited by examiner

Primary Examiner—Zarni Maung
Assistant Examiner—George Lawrence Opie
(74) Attorney, Agent, or Firm—Dickstein, Shapiro, Morin & Oshinsky LLP.

(57) ABSTRACT

In a real-time operating system, a plurality of tasks is grouped into blocks in consideration of the deadline times required by each task, switching between tasks that belong to the same block, is not done by the task switch of the real-time operating system, but rather is done directly by a task block scheduler, so that tasks within one and the same block are substantially treated as the same task. Only when the execution of a task belonging to a block that is different from the block of the currently executing task is to be started is the task switch used to switch between tasks, thereby reducing the load placed on the real-time operating system in managing tasks.

8 Claims, 11 Drawing Sheets

| Program | Frame Size | Sampling Frequency | Dead line Time | Occupied Time |
|---|---|---|---|---|
| A | 4 | 44.1kHz (22 $\mu$s) | 88 $\mu$s | 11 $\mu$s |
| B | 4 | 44.1kHz (22 $\mu$s) | 88 $\mu$s | 44 $\mu$s |
| C | 4 | 22.051kHz (44 $\mu$s) | 176 $\mu$s | 33 $\mu$s |
| D | 4 | 22.05kHz (44 $\mu$s) | 176 $\mu$s | 66 $\mu$s |
| E | 8 | 44.1kHz (22 $\mu$s) | 176 $\mu$s | 66 $\mu$s |
| F | 16 | 44.1kHz (22 $\mu$s) | 352 $\mu$s | 110 $\mu$s |

(b)

| Program | CC | FC1 | FC2 |
|---|---|---|---|
| A | 4 | 1 | 4 |
| B | 4 | 1 | 4 |
| C | 8 | 1 | 8 |
| D | 8 | 1 | 8 |
| E | 8 | 1 | 8 |
| F | 16 | 1 | 16 |

FC1: Sampling Frequency

CC, FC2: Timer clock Frequency * Frame size

Fig. 7

Interval Table 20

| Task Block NO. | Task NO. | |
|---|---|---|
| 0 | 0 | CC / FC1 / FC2 |
|   | 1 | CC / FC1 / FC2 |
|   | ⋮ | ⋮ |
|   | m | CC / FC1 / FC2 |
| 1 | 0 | CC / FC1 / FC2 |
|   | 1 | CC / FC1 / FC2 |
| ⋮ |   | ⋮ |
| n | 0 | CC / FC1 / FC2 |
|   | 1 | CC / FC1 / FC2 |

REAL-TIME OPERATING SYSTEM AND A TASK MANAGEMENT SYSTEM THEREFOR

BACKGROUND OF THE INVENTION

1. Field of the Invention

The present invention relates to a real-time operating system that is suitable for a multimedia system which is capable of executing a plurality of tasks continuously and in real time, so as to handle a variety of data, and to a task management method therefor, and also to a computer which executes tasks in accordance with the above-noted real-time operating system and to a storage medium into which is stored the above-noted real-time operating system.

2. Description of Related Art.

Heretofore, a real-time operating system which can execute a plurality of tasks simultaneously in real time, has been used in many technical fields including controlling systems, computers or the like. And recently, there is a trend in that requirements for this kind of operating system have been increased. Further, on the other hand, it has been required that this kind of real-time operating system should be matched to so called multi-media systems in which various data should be handled.

In such a multimedia system, the data that is handled can be such data as voice data, image data and the like, and the programs that handle each type of data often have differing sampling frequencies, frame sizes, and number of execution cycles. For this reason, in an operating system of the past which performs overall management, as tasks, of these programs that handle the various types of data, it is required to assign these tasks to a CPU with good efficiency.

Additionally, in a real-time operating system such as has been used in the past, because there were no absolute limitations with regard to the execution times of each of the various tasks, the performance demanded from such a real-time operating system was not absolute. However, when applying such a real-time operating system in which there is no absolute limit with regard to execution time to a multi-media system such as noted above, there is the problem of not being able to perform high-speed execution of tasks which have differing execution times and also which have time limitations.

In the Japanese Unexamined Patent Publication No. H1-181130 (hereinafter referred to as the reference), there is a disclosure, as a method of starting a task of a real-time operating system, of the storage of the periodic starting interval for each task and each task name into a system management table beforehand, and the judging of the starting method for a stored task, as well as the starting of each task at the stored periodic interval therefor.

However, in the task starting method of the reference, because there is the need to access the real-time operating system each time the task is switched, it is not possible to perform quick task switching, thus causing an unavoidable drawback of not being able to meet the need for increased speed.

More specifically, when switching is done from one task to another task, a task switch in the real-time operating system is used, which is accompanied by an unavoidable operational overhead. Therefore, in the case in which a number of tasks having large time limitations are to be periodically executed, the amount of time occupied by the real-time operating system becomes large, so that there is the problem of each task not being completed by the time in which it is to be executed. Also, if switching by the task switch is performed frequently, the amount of time required for task monitoring becomes large, thus reducing the amount of time allocated for execution of each task.

In view of the above-described drawbacks in the prior art, an object of the present invention is to provide a real-time operating system that can be applied to a multimedia system.

Another object of the present invention is to provide a real-time operating system that can perform quick switching between a plurality of tasks.

Yet another object of the present invention is to provide a real-time operating system that can perform processing of tasks, without excesses or deficiencies, even when the tasks have differing execution times, frame sizes, and sampling frequencies.

Still another object of the present invention is to provide a computer which is operated by the above-noted real-time operating system and a storage medium into which is stored the above-noted real-time operating system.

SUMMARY OF THE INVENTION

According to one embodiment of the present invention, in a real-time operating system which is capable of executing a plurality of tasks by switching a task switch, this plurality of tasks, based on a pre-established criterion is classified into groups as task blocks. When switching between tasks which belong to one and the same task block, switching is done directly within that task block, without the intervention of the above-noted task switch. The above-noted task switch only performs switching when switching is done between tasks that do not belong to one and the same task block.

According to another embodiment of the present invention, a real-time operating system is provided wherein a scheduler for the purpose of selecting a task from within the above-noted task block is provided for each task block and the above-noted pre-established criterion is established by the deadline time for processing, that is, the frame size and sampling frequency, of each task, this being used to establish whether or not tasks are to be made part of the same block with other tasks.

In addition, according to yet another embodiment of the present invention, a computer is provided which includes the above-noted real-time operating system, and a storage medium is provided in which the above-noted real-time time operating system is stored.

According to yet another embodiment of the present invention, a task management method is provided which is used by a real-time operating system that is capable of executing a plurality of tasks sequentially in real time, wherein according to a pre-established criterion the above-noted plurality of tasks is classified into groups as task blocks, and whereby access to the task switch of the real-time operating system is managed in units of these task blocks.

DESCRIPTION OF THE DRAWINGS

FIG. 2(a) is a table which shows, by way of example, parameters of a plurality of programs executed by the real-time operating system according to the present invention.

FIG. 2(b) is a table illustrating frame counter information for each of the programs shown in FIG. 2(a).

FIG. 7 is a table for the purpose of describing the configuration of an interval table that is used in the embodiment of the present invention which is shown in FIG. 6.

DETAILED DESCRIPTION OF THE PREFERRED EMBODIMENTS

Embodiments of a real-time operating system according to the present invention are described below, with reference being made to the relevant accompanying drawings.

Figure 1:
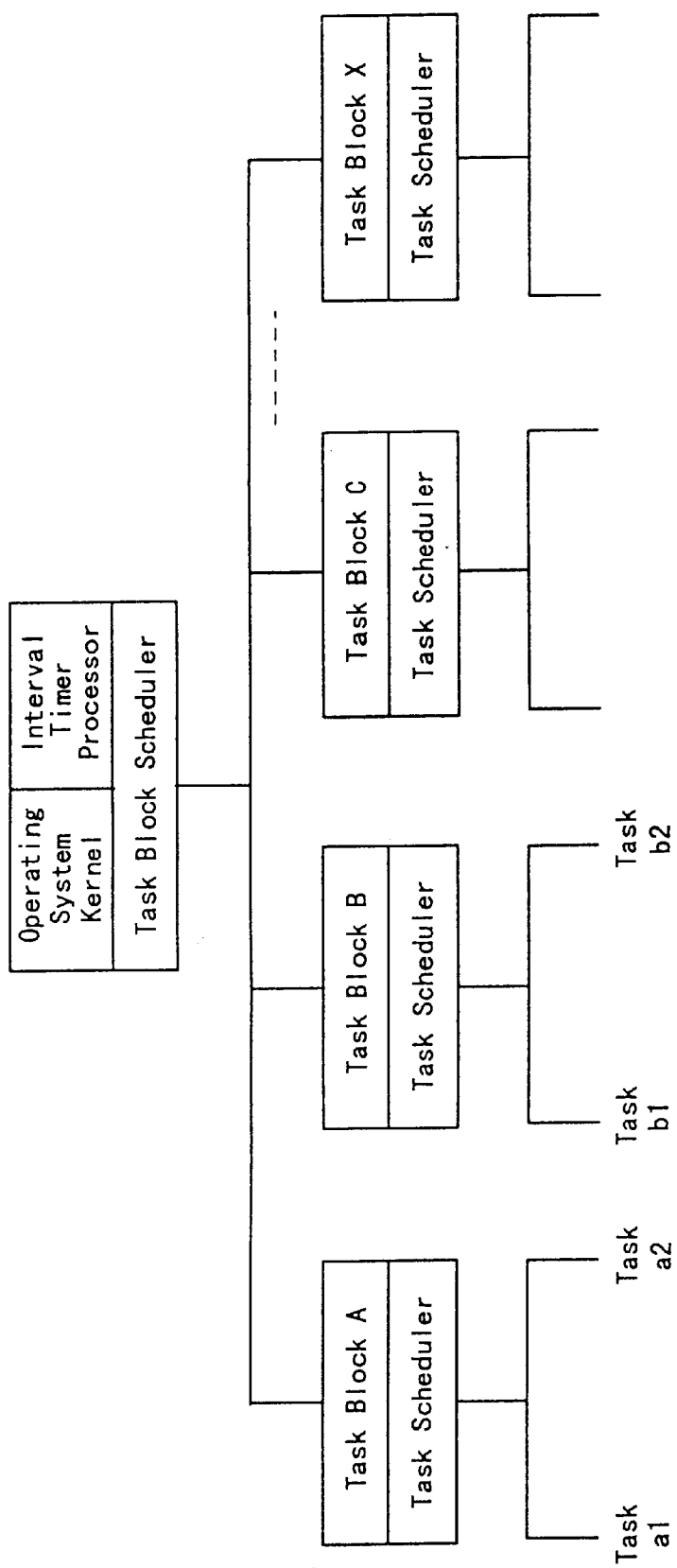
FIG. 1 is a drawing which illustrates the principle that is used to described the concept of the real-time operating system according to the present invention.

Referring to FIG. 1, the conceptual configuration of the present invention will be described. The real-time operating system shown in the drawing has an operating system kernel part, an interval timer processing section that receives a timer interrupt, and a task block scheduler. In the task block scheduler, the schedule for the task blocks A to X are managed. As shown in this drawing, each of the task blocks A to X includes tasks that have been grouped, and in this example tasks a1 to a2 belong to the task block A. In the same manner, other task blocks have grouped tasks, such as the tasks b1 to b2. Grouped tasks, as will be described later, have mutually similar attributes, that is, they possess a grouping criterion, and they are classified in accordance with the similarity of this attribute. The real-time operating system according to the present invention in this case only manages the switching between the scheduling between the task blocks A to X, but does not manage the switching between tasks within each of the task blocks. For this purpose, a task scheduler which manages the tasks within each task block is provided individually within each task block A to X.

In this configuration, when switching to a task within a same task block, switching is performed based on control by the task scheduler within each task block, and without accessing the real-time operating system, and only when switching is to be performed between different task blocks is the real-time operating system accessed so as to perform switching of tasks by the task switch. Therefore, in the configuration which is shown in the drawing, the frequency of switching by the task switch in the real-time operating system is made small, thus resulting in a great reduction in the load on the real-time operating system.

Referring now to FIG. 2(a), a specific example of task management in a real-time operating system according to the present invention will be described. This description will be for the case in which the programs that are processed by the real-time operating system are the six programs A, B, C, D, E, and F shown in FIG. 2(a) and FIG. 2(b), which are classified into groups.

In principle, between a plurality of programs that are executed simultaneously, as long as the required deadline time for processing of each of the programs does not exceed the predetermined deadline time even if the task switch is not used between the programs, it is possible to form groups or blocks.

In this description, the deadline time is established by the frame size and the sampling frequency (that is, the sampling period). The frame size and sampling frequency (sampling period) each signifying the allowable time frame for program execution and the execution period of the program, respectively. For example, with a frame size of 2 and a sampling frequency of 22.05 kHz (that is, a period of 44 $\mu$s), the deadline time would be 88 $\mu$s. Stated differently, the execution for this program should be completed within this deadline time.

Additionally, it is necessary to consider the amount of time occupied from the start of execution of the program being executed through each sampling period to its completion. The occupied time data is not given to the real-time operating system, but rather is something that the designer needs to be aware of, not just in the case of the present invention, but in the case of any system that is required to operate in real time.

As shown in FIG. 2(a), the program A has a frame size of 4, a sampling frequency of 44.1 kHz (22 $\mu$s period), a deadline time of 88 $\mu$s, and an occupied time of 11 $\mu$s, the program B has a frame size of 4, a sampling period of 44.1 kHz (22 $\mu$s period), a deadline time of 88 $\mu$s, and an occupied time of 44 $\mu$s, In the same manner, the program C has a frame size of 4, a sampling period of 22.05 kHz (44 $\mu$s period), a deadline time of 176 $\mu$s, and an occupied time of 33 $\mu$s, and the program D has a frame size of 4, a sampling frequency of 22.05 kHz (44 $\mu$s period), a deadline time of 176 $\mu$s, and an occupied time of 66 $\mu$s. The program E has a frame size of 8, a sampling period of 44.1 kHz (22 $\mu$s period), a deadline time of 176 $\mu$s, and an occupied time of 66 $\mu$s, and the program F has a frame size of 16, a sampling period of 44.1 kHz (22 $\mu$s period), a deadline time of 352 $\mu$s, and an occupied time of 110 $\mu$s.

Figure 3:
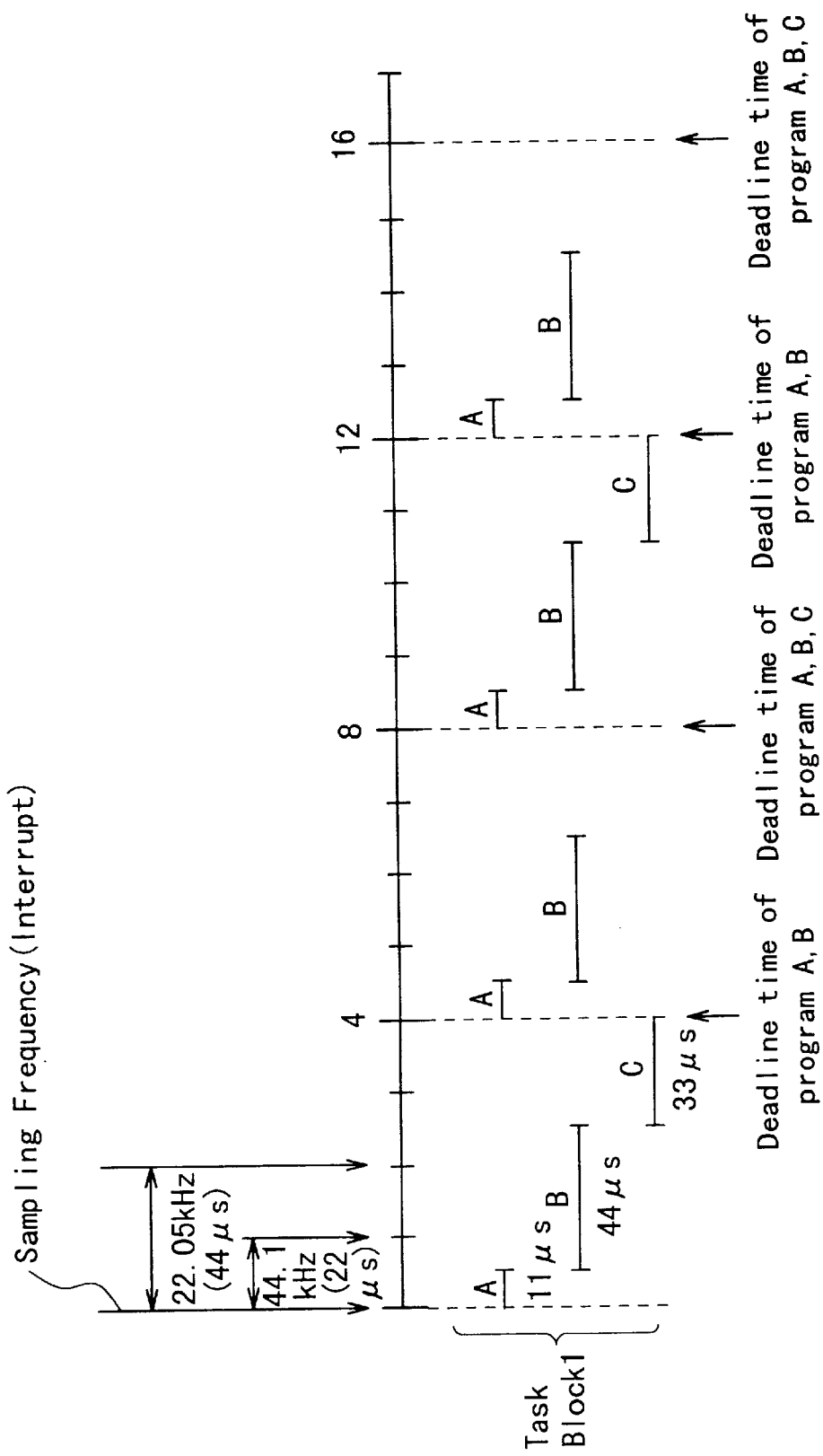
FIG. 3 is a time chart for the purpose of describing an example of a combination of programs which can be made to belong to the same block and the operation thereof, within the program which is shown in FIG. 2.

Of these programs A, B, C, D, E, and F, the case in which the tasks of programs A, B, and C are grouped together will now be examined, with reference being made to FIG. 3. If programs A, B, and C are to be executed in that sequence, as is clear from FIG. 2(a), because the deadline times of the tasks of programs A and B are 88 $\mu$s, while the deadline time of the task of program C is 176 $\mu$s, if the processing for each program can be completed in the established occupied time therefor within the deadline times therefor, it is possible to group these programs A, B and C together in one and the same task block.

In FIG. 3 we see the task excution times for each of the programs if we use the sampling frequency of 44.1 kHz (22 $\mu$s period) as the reference: time unit (1). As shown in FIG. 3, with regard to program A and program B, the deadline times for both programs are 88 $\mu$s, that is, processing which occupies the time of 11 $\mu$s and 44 $\mu$s is performed during a time period 4 units. Additionally, within these 4 time units, it is possible to perform the task within an occupied time of 33 $\mu$s related to the program C as well. Therefore, within the deadline time of 176 $\mu$s that is established for the program C, it is possible to execute the task of program C. Next, during the 4 unit period from time unit 4 to unit 8, which spans from 88 μs to 176 μs, the tasks of only program A and program B can be executed, with the task of program C not being executed. Because the task of program C is executed in the 4 unit period from time unit 8 to time unit 12, which spans from 176 μs to 264 μs, it can be seen that program C is executed within the deadline time of 176 μs established for program C.

Therefore, the tasks for these programs A through C can be grouped into one and the same task block.

Figure 4:
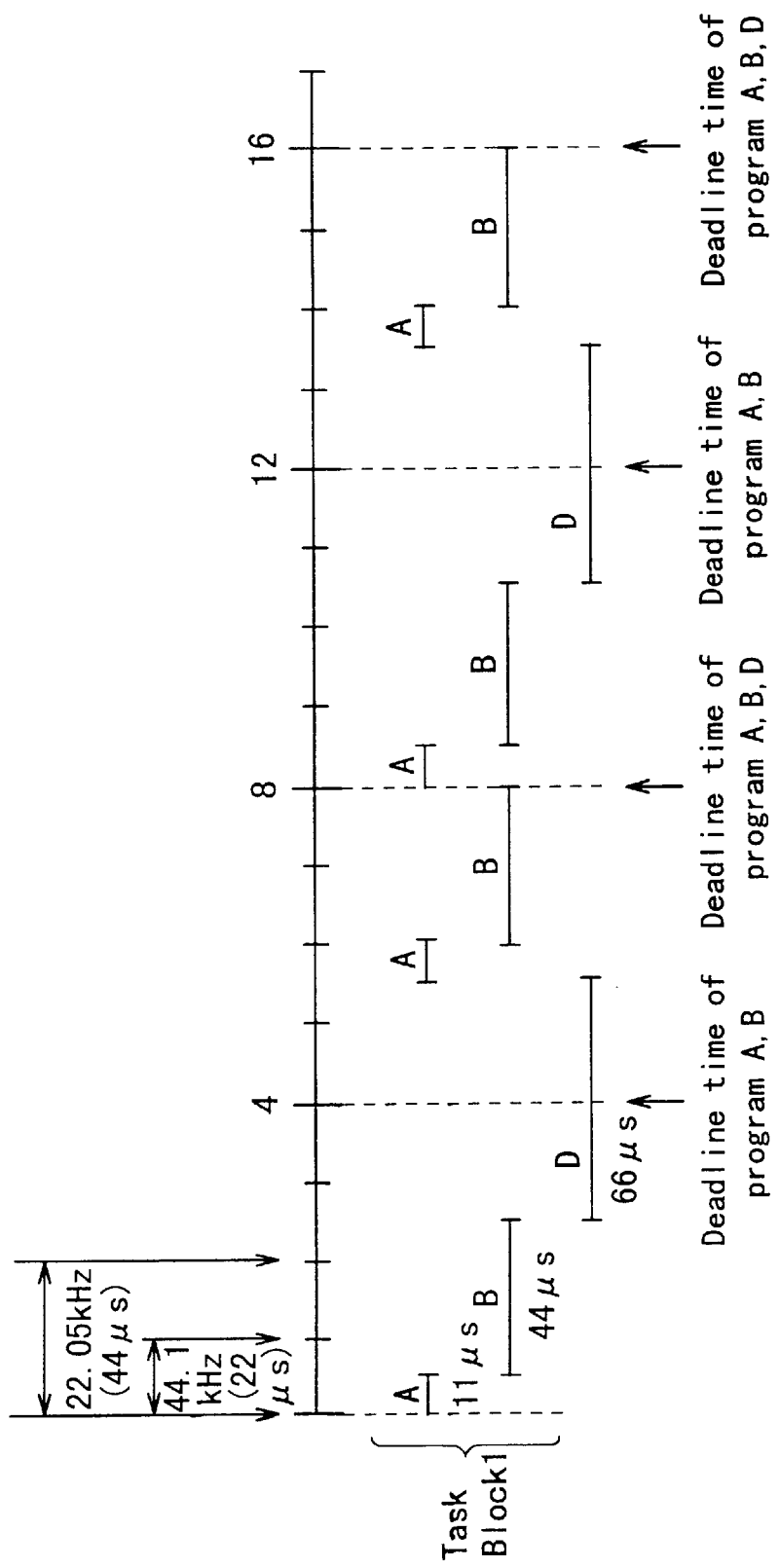
FIG. 4 is a time chart for the purpose of describing another example of a combination of programs which can made to belong to the same block and the operation thereof, within the program which is shown in FIG. 2.

In FIG. 4, it is shown that programs A, B, and D can be grouped into one and the same task block. The programs A, B, and E shown in FIG. 2 can also be grouped in one and the same task block in the same manner.

With respect to program A and program B. the grouping of a program such as program F, which has not only a relatively long deadline time but also a long occupied time, in the same group as programs A and B, would mean that the deadline times of the other programs A and B would be exceeded within the occupied time of the task associated with the program F, making it difficult to treat the tasks of programs A, B, and F as being in one and the same task block. This indicates that it is not desirable to perform switching with respect to program F without making use of the task switch of the real-time operating system. Referring is FIG. 5, we see that, with program A and program B grouped into a task block 1, task F is grouped into a separate task block 2. By virtue of this configuration, it is possible to execute the tasks associated with each of these three programs in real time. Stated more specifically, the program A and program B tasks, which belong to one and the same task block 1, as shown in FIG. 3 and FIG. 4, can be executed within the deadline time that is established for both of the tasks of program A and program B, without the intervention of the task switch of the real-time operating system. In contrast to this, when switching from task block 1 to program F, which belongs to the task block 2, which is different from the task block to which program A and program B belong, switching is performed by the task switch of the real-time operating system. During the execution of the task of the program F, when the deadline time of program A and program B is reached, switching to the task block 1 is performed under control by the task switch.

In the example shown in the drawing, each time the task of program B is completed, switching is done to program F by means of the task switch, so that after the deadline time of the program A and program B, for example after execution of program F for just 33 μs, switching is made again to the program A, by means of the task switch. Thereafter, program F is executed in time-division fashion during the remaining deadline times established for program A and program B until at last the processing of the program F task is performed for the 110 μs occupied time within the deadline time of 352 μs established for the program F.

In this manner, by using the task switch only when the task block is switched, it is possible not only to shorten the amount of time required for operation of the task switch, but also to lighten the load applied to the real-time operating system.

Figure 5:
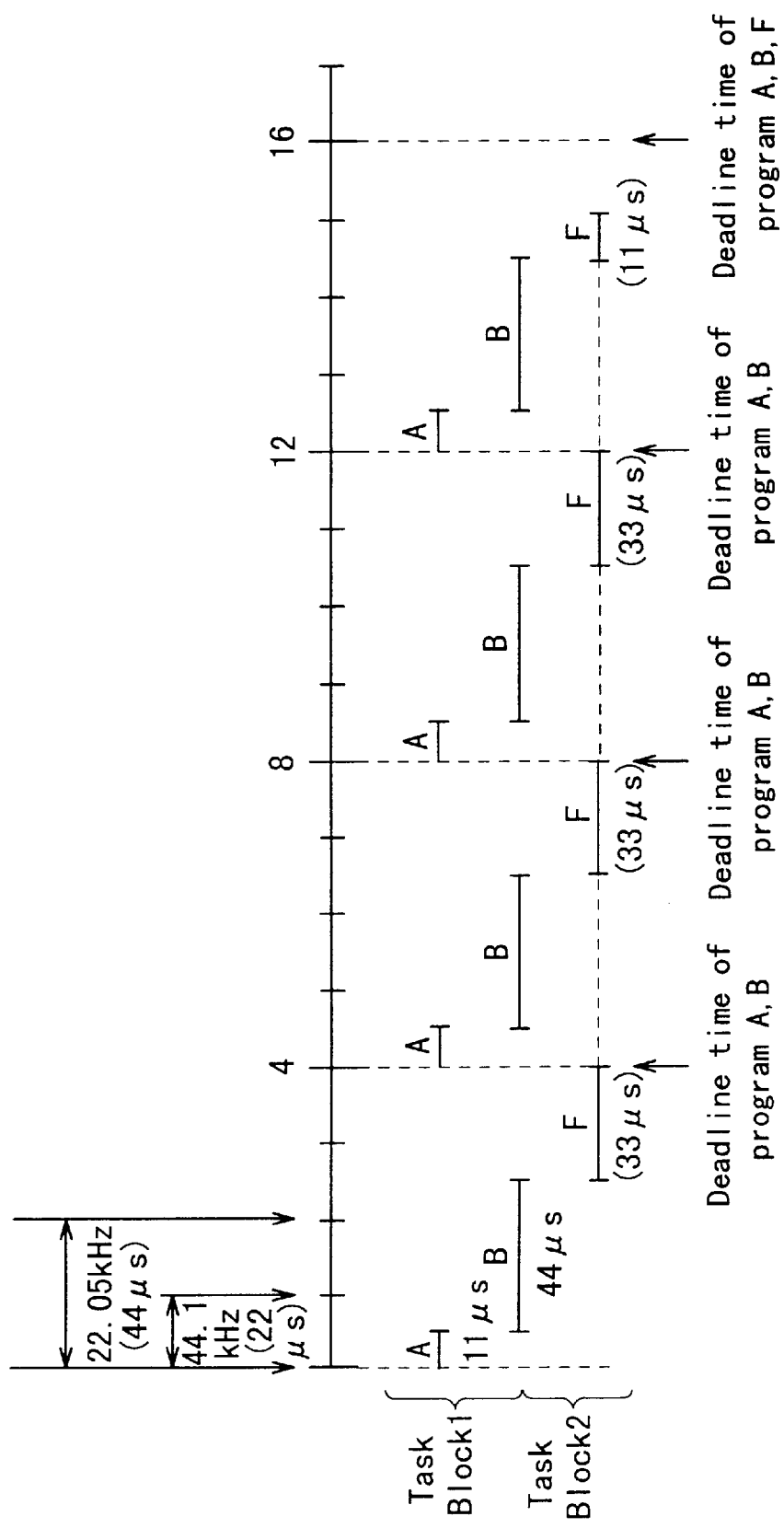
FIG. 5 is a time chart for the purpose of describing an example of a combination of programs which cannot be made to belong to the same block and the operation thereof, within the program which is shown in FIG. 2.

In the prior art, however, the programs A to F are not divided into task blocks, so that in the case in which when each program task is ended or the task switch of the real-time operating system is used in response to an interrupting signal, for example when switching from program A to program B, when switching from program B to program F, and when switching from program F to program A in FIG. 5, the execution of each task is delayed by the amount of time of the operation of the task switch, so that ultimately it is not possible to execute program F within its established deadline time. Therefore, relying only on the task switch of the real-time operating system to perform switching of tasks is predicted to not be able to accommodate the mixture and variety of programs that is expected in multimedia applications.

Figure 6:
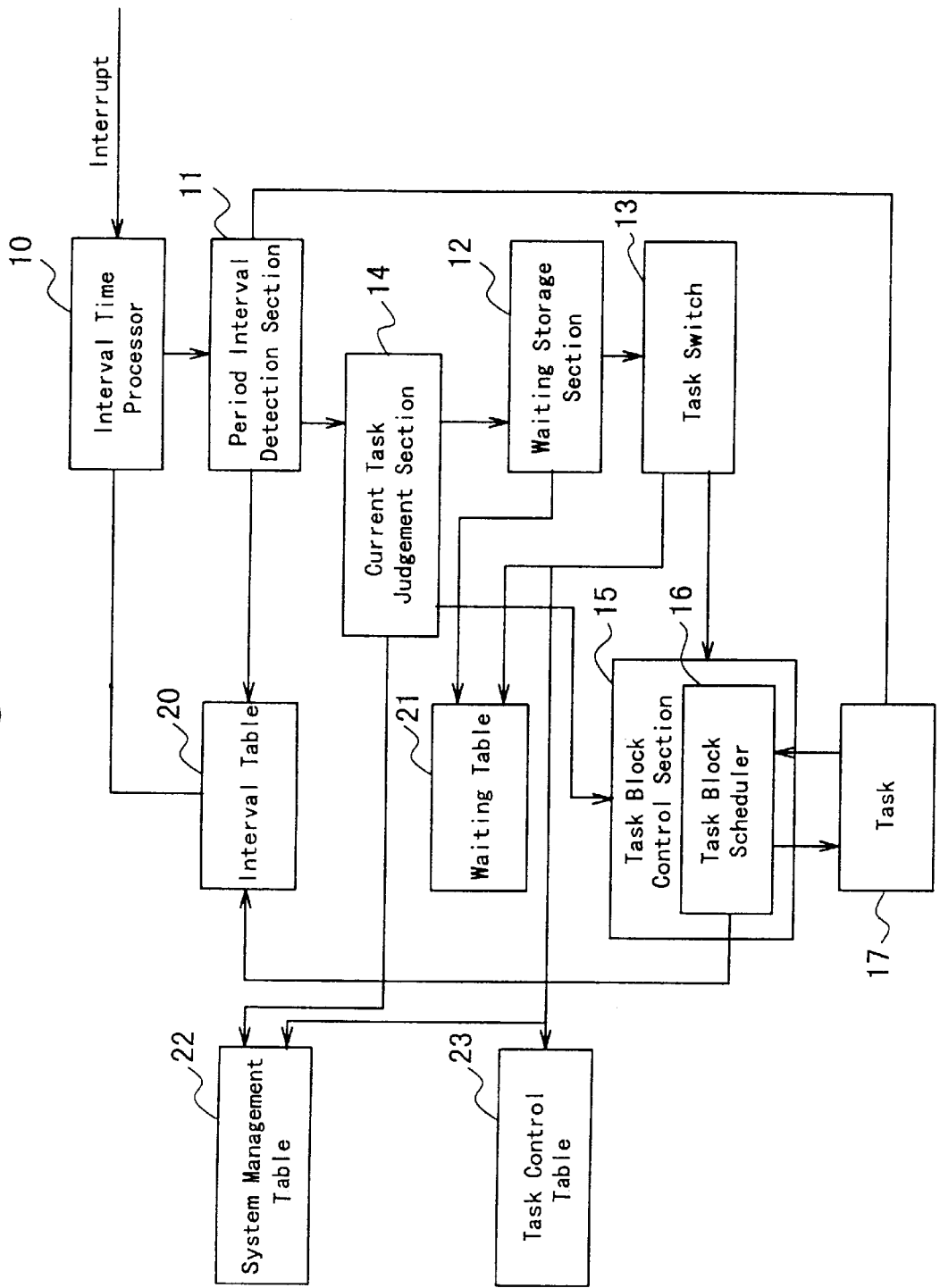
FIG. 6 is a block diagram for the purpose of describing a real-time operating system according to an embodiment of the present invention.

Referring to FIG. 6 we see a block diagram that illustrates an embodiment of a real-time operating system that performs the operations shown in FIG. 2 through FIG. 5.

The real-time operating system which is shown in FIG. 6 is represented by blocks which can be characterized in terms of unit processing operations. In this case, it has an interval timer processor 10 which operates upon receiving an interval timer interrupt, a period interval detection section 11, a waiting storage section 12, a task switch section 13, a current task judgment section 14, and a task block control section 15. The task block control section 15 shown in FIG. 6 has a task block scheduler 16, which schedules the start of the execution of a task belonging to that task block, and 16 manages the operation of a task 17 within the task block. In the example shown in this drawing, there are provided an interval table 20, a waiting table 21, a system management table 22, and a task control table 23. The above-noted period interval detection section 11, waiting storage section 12, task switch 13, and current task judgment section 14 operate as a task scheduler for the purpose of controlling the start of the execution of the current task.

In this example, the interval table 20 is a table that monitors the execution starting times of each task, the contents of this interval table 20 being updated by the interval timer processor each time an interval timer interrupt occurs. The period interval detection section 11 accesses the interval table 20, searches for a task that must be executed and, based on the results of that search, controls the current task being executed, i.e. task 17. Specifically, if as a result of the search by the period interval detection section 11 it is discovered that there is a task existing in the interval table 20 the execution of which must be started, the period interval detection section 11 sends the task which must be started to the current task judgment section 14.

At the current task judgment section 14, a judgment is made as to which task block the above-noted task belongs, and in the case in which the task block to which it belongs is the same block in which the currently executing task belongs, the current task judgment section 14 indicates to the task block control section 15 that the next task belongs to the same task block. At the task block control section 15, the task block scheduler 16 switches the currently executing task 17 to the task that is indicated by the current task judgment section 14, and the execution of that task is started.

If, however, the current task judgment section 14 judges that the task which must start execution is not in the same task block as the current task, the task which must be started is recorded in the waiting table 21 by the waiting storage section 12, and the waiting storage section 12 also instructs the task switch 13 that a task has arrived that belongs to a different task block. At the task switch 13, when the instruction from the waiting storage section 12 is received, the waiting table is accessed, and an instruction is given to the task block control section 15 so that switching is made to the task which must start execution that is recorded in the waiting table 21, whereupon the task block control section 15 performs switching to the task in the different task block.

When this is done, the task switch 13 updates the task information in the system management table 22 and uses the task control table 23 to perform saving and resetting of the task resources.

As described above, according to the present invention, a plurality of tasks 17 are grouped together in one and the same task block, in accordance with criteria such as the deadline time of each program. For this reason, only when it is necessary to execute a task belonging to a different task block is switching performed by the task switch section 13 to the task that is stored in the waiting table 21, thus greatly reducing the frequency of use of the task switch section 13 that is controlled by the real-time operating system. This results in a great lessening of the load placed on the real-time operating system.

As described above, all of the tasks 17 are executed in accordance with the interval table 20, and are managed by each task block by the task block scheduler 16.

Next, the contents of the interval table 20 will be described, with reference being made to FIG. 7.

In FIG. 7, the example of the interval table 20 is that in which it contains n+1 task blocks ranging from 0 to n, each of these task blocks in turn containing m+1 tasks ranging from 0 to m. That is, the interval table 20 is divided into areas for each of n+1 task blocks, each of these task block areas being further divided into m+1 task areas. In each of the task areas, a current frame counter CC, a first frame counter FC1, and a second frame counter FC2 are provided. In this example, the current frame counter CC is set to an initial value that is the product of the clock frequency of a timer provided in the real-time operating system and the frame, size of the particular program. With regard to the other counters, the first frame counter FC1 is set to an initial value that is the sampling frequency of the particular program, and the second frame counter FC2 is set to an initial value that is the product of the timer clock frequency and the frame size.

For example, in the case of the program A that is shown in FIG. 2(b), the current frame counter CC is set to the product of the 44.100-kHz timer clock frequency and the frame size of 4, the first frame counter FC1 is set to the sampling. frequency of 44.100 kHz, and the second frame counter FC2 is set to the product of the 44.1-kHz timer clock frequency and the frame size of 4.

In this case, the contents of all the current frame counters CC that exist in the interval table 20 are decremented in accordance with the count value in the first frame counter FC1 each interval of the timer clock frequency, and at the point at which the current frame counter CC is 0 or below, this indicates a program that is to be started executing. When a task is completed, the contents of the current frame counter CC are successively counted up in accordance with the second frame counter FC2 corresponding to the completed task, so as to monitor the deadline time.

By monitoring the contents of the above-noted interval table 20, it is possible to perform the operation that is illustrated in FIG. 1 through FIG. 5.

The operation of the present invention will be explained with reference to the flow-charts shown in FIGS. 8 to 10 and FIG. 11, hereunder.

First, an explanation will be given for FIG. 8;

In the real-time operating system, as explained above, since when the value of the current frame counter CC becomes below zero (0) the task is indicated to be commenced, the value of the current frame counter CC of each one of the tasks is updated every time it receives an interval timer interrupt signal and the operating system monitors a timing for starting to execute each one of the tasks.

Thus, the interval timer processor 10 reduces the value of the current frame counter CC of the overall tasks as explained above, in response to a value of timer count, at every time when it receives the interval timer interrupt signal.

Accordingly, for initial values, a value of a variable A which counts the number of task blocks is set at zero (0), while a value of a variable B which counts the number of tasks in each one of the task blocks is set at zero (0) and then the value of a variable A is increased by the number of task blocks, while the value of a variable B is decreased by the number of tasks in each one of the task blocks, and meanwhile, a value of the first frame counter FC1 is deducted from the value of the current frame counter CC of each one of the tasks so that a priority for starting to execute of the respective tasks can be determined.

Further, when the updating operation of the current frame counter CC for all of the tasks have been completed, the operation will be shifted to the period interval detection section 11.

Figure 9:
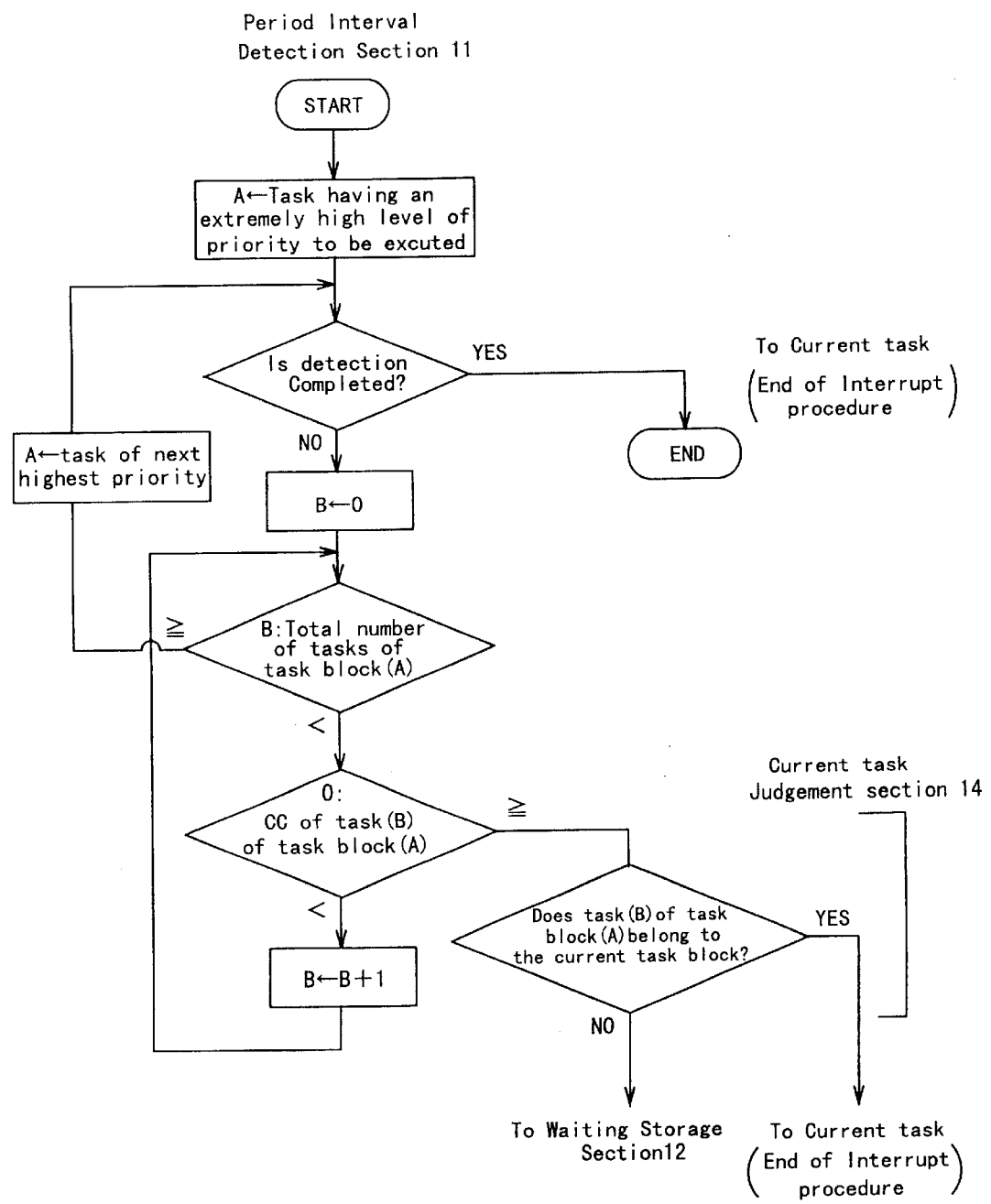
FIG. 9 shows a flow-chart indicating operations of the period interval detection section.

In the period interval detection section 11 as shown in FIG. 9, when a task having an extremely high level of priority to be executed is in a separated task block, since it must be executed first, this kind of monitoring operation should be carried out both in a current task block which is now being executed and in all of the task blocks which is not being executed now.

In this embodiment, the task block numbers are inserted into the variable A, respectively, in accordance with the level of priority possessed by each one of the tasks from the highest level to the lowest level and simultaneously, this detection section 11 monitors whether or not a task having the value of the current frame counter CC being below zero would be generated in each of the task blocks.

Therefore, in this embodiment, under a routine operation, the task number of each one of the task blocks is inserted into the variable B in each one of the task blocks, and simultaneously, the value of this variable B is increased so that the task which should be executed with the highest priority can be detected.

When the value of the current frame counter CC of each one of the tasks is below zero, it can be easily detected that such tasks are in a timing to be executed, or by checking the value thereof, the priority of the task can easily be determined.

Figure 8:
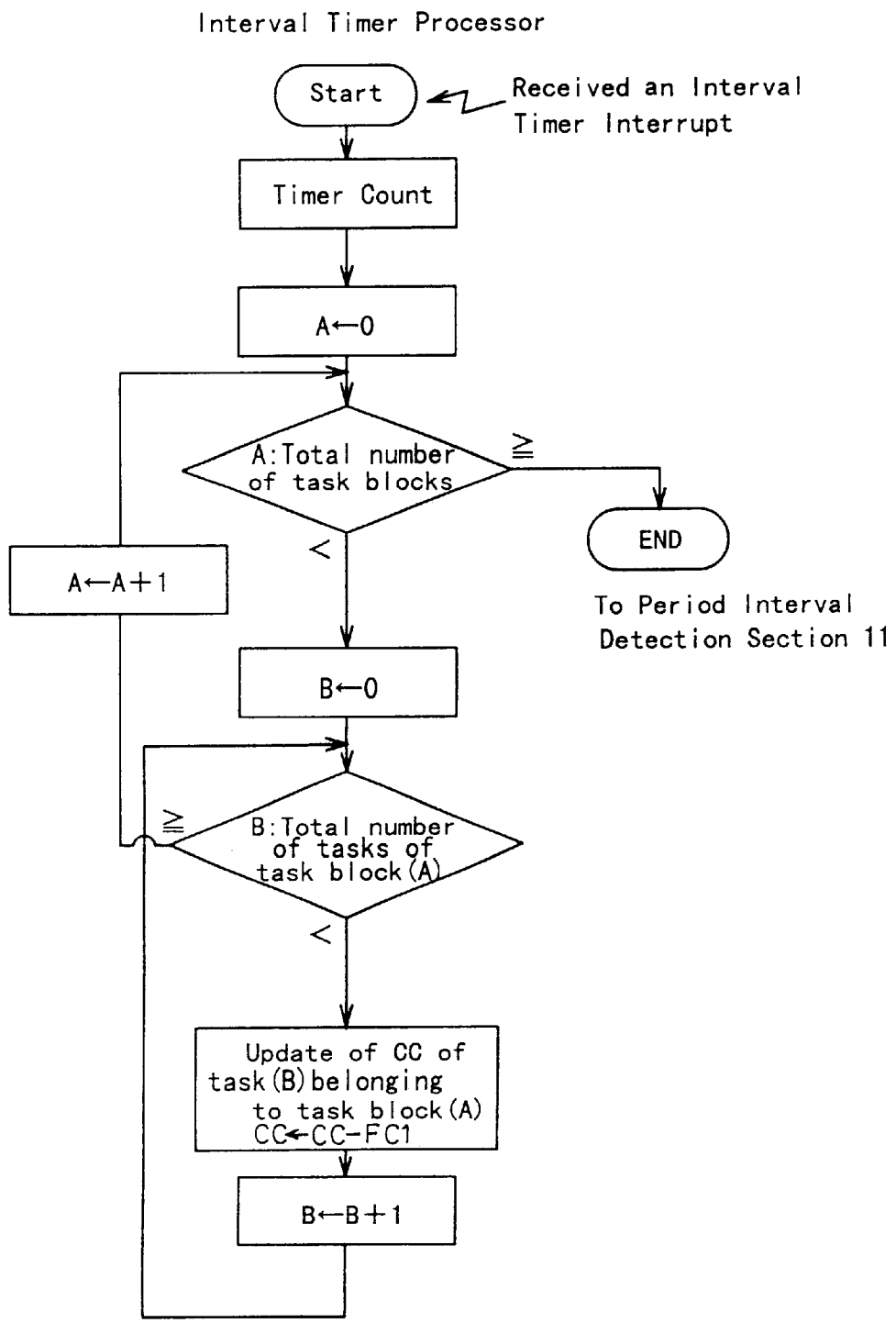
FIG. 8 show a flow-chart indicating operations of the interval timer processor.

If when the task to be executed is not a task in the current task block, this task should be registered into the waiting storage section 12, while if the task to be executed exists in the current task block, this task should be executed and thereafter the interval intervening routine as shown in FIGS. 8 and 9 will be ended.

Figure 10:
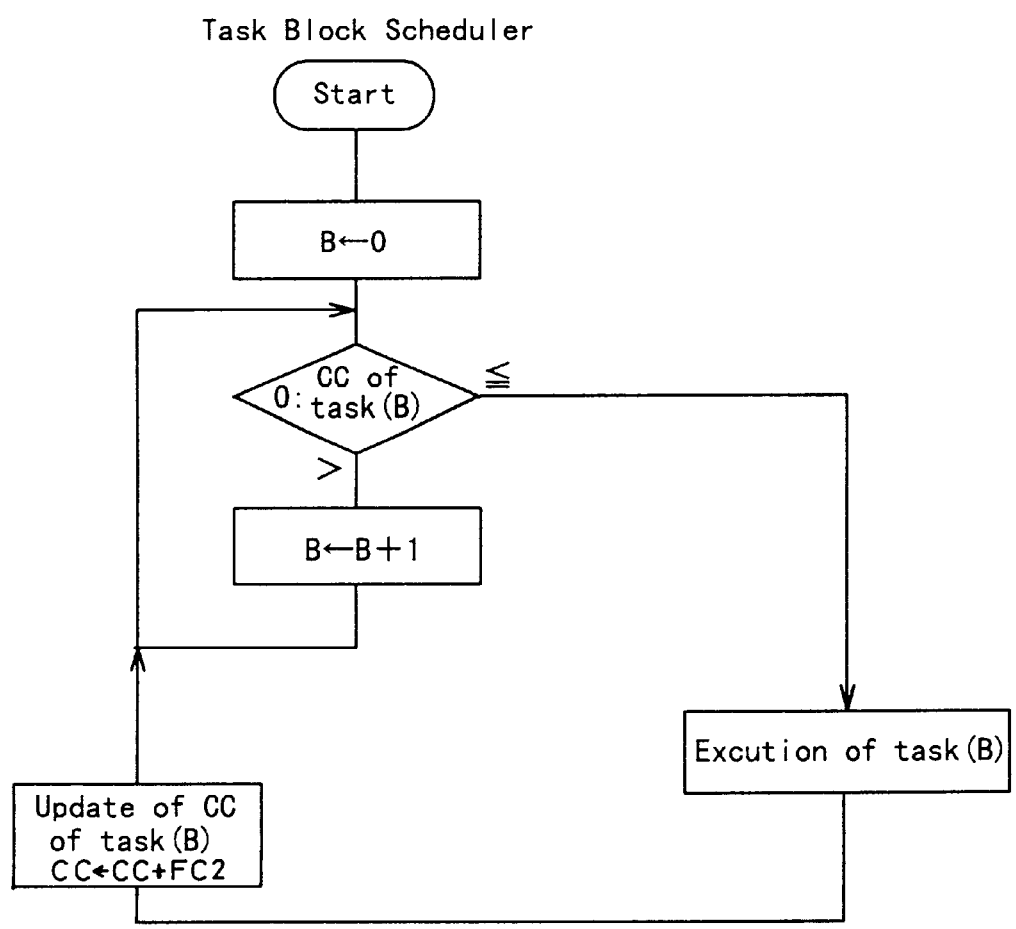
FIG. 10 shows a flow-chart indicating operations of the task block scheduler.

On the other hand, as shown in FIG. 10, the task block scheduler 16 is provided in each one of the task blocks and monitors the condition of each one of the tasks. When an operation of a task in the current task block is completed, a value of the second frame counter FC2 is added to the value of the current frame counter CC of the task so as to detect a task to be executed with respect to the value of the current frame counter CC.

Accordingly, in this embodiment of the present invention, the number of the variable B is increased to the number of tasks existing in the current task block while monitoring the number of the current frame counter CC for all of the tasks existing in the current task block. Then when the executing operation has been completed, the value of the current frame counter CC for the certain task will be updated.

Figure 11:
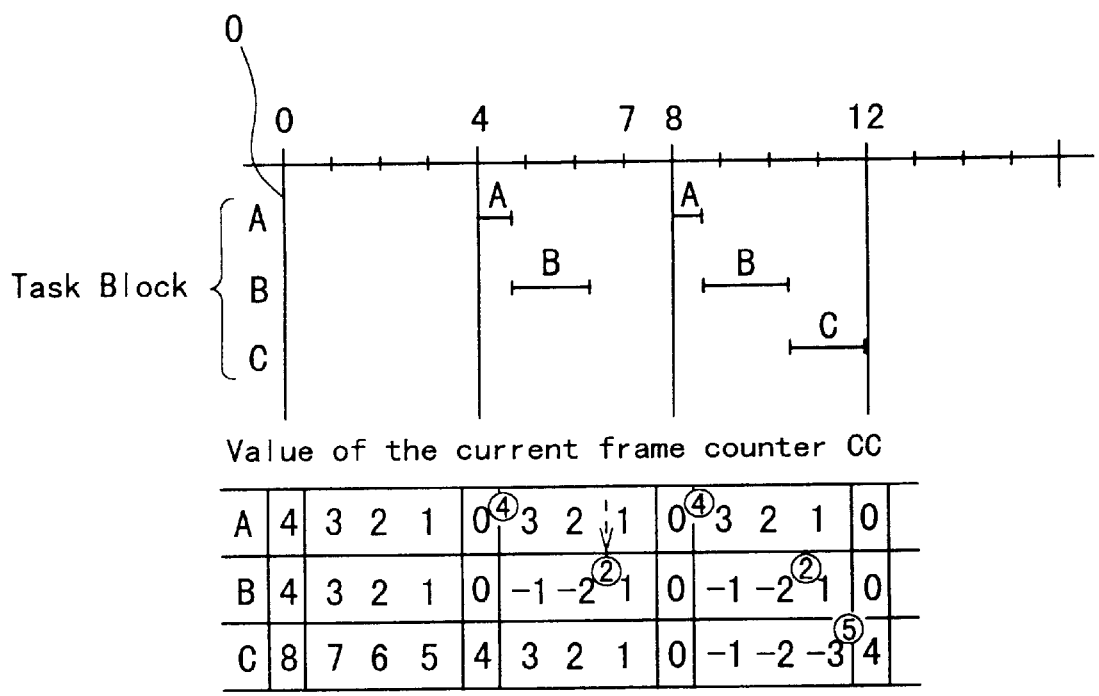
FIG. 11 show conditions for parameters varied in accordance with execution for each one of the tasks.

Another embodiment will be explained with reference to FIG. 11, hereunder. For example, the value of the current frame counter CC of the task A is 4, and FC1 and FC2 thereof are 1 and 4, respectively.

On the other hand, the value of the current frame counter CC of the task B is 4, and FC1 and FC2 thereof are 1 and 4, respectively.

Further, the value of the current frame counter CC of the task C is 8, and FC1 and FC2 thereof are 1 and 8, respectively.

At a deadline of zero (0), the values of the current frame counter CC of each of the tasks A, B, C are 4, 4, and 8, respectively. At a deadline being 4, the values of the current frame counter CC of each of the tasks A, B, C are 0, 0, and 4, respectively.

Now, at a time when the task A has been completed after it started to operate, although the value of the current frame counter CC of the task A is −1, it will be increased by 4 when the interval timer interrupt is generated so that the value thereof is changed into 3.

On the other hand, the values of the current frame counter CC of the tasks B and C are both deducted by −1, when the interval timer interrupt is generated so that both values will be changed into −1 and 3, respectively. Accordingly the task B, the values of the current frame counter CC of which becomes below zero, is started.

When the operation of the task B is completed, the values of the current frame counter CC of each of the tasks A and C are 1 and 1, respectively, while the value of the current frame counter CC of the task B, now −3 is increased by 4 so as to make the the value of the current frame counter CC of the task B equal to, 1.

Further, at a time when the deadline is 8, the values of the current frame counter CC of each of the tasks A, B, C are 0, 0, and 0, respectively, and therefore, the task A will be restarted in accordance with a predetermined manner.

As described in detail above, according to the present invention, by grouping a plurality of tasks into blocks or groups, and by switching tasks within a group without using the real-time operating system, but rather by using a block scheduler that manages the task block, it is possible not only to greatly improve the overhead occurring because of task switching, but also to reduce the load on the real-time operating system. Additionally, according to the present invention, because it is possible to manage the accessing of the real-time operating system in units of task blocks which include a plurality of tasks, it is possible to reduce the load placed on the real-time operating system.

What is claimed is:

1. A real-time operating system which generates an interrupt signal at periodic intervals and is capable of executing a plurality of tasks sequentially and in real time, comprising:
   a task switch;
   a plurality of tasks each having a predetermined deadline time spanning at least one periodic interval between interrupt signals, and each task being associated with a count value, wherein the plurality of tasks is classified into task blocks such that each of the tasks in a respective task block can be completed within the respective predetermined deadline time for that task, wherein each task block is managed by a respective task block controller; and
   means for decrementing the count value for each task upon each generation of an interrupt signal, and for designating that a task is due to be executed when the respective count value for that task is equal to or less than zero,
   wherein switching between tasks which belong to the same task block is achieved directly within said task block by said respective task block controller and without intervention from said task switch, said task switch only performing switching when switching is done to a task that does not belong to the same task block.

2. A real-time operating system according to claim 1, further comprising a scheduler provided for each task block for selecting a task from within the respective task block.

3. A real-time operating system according to claim 1, wherein said deadline time of each task is established by a frame size and a sampling frequency of the respective task.

4. A recording medium which includes a real-time operating system which generates an interrupt signal at periodic intervals and is capable of executing a plurality of tasks sequentially and in real time, wherein the real-time operating system comprises:
   a task switch;
   a plurality of tasks each having a predetermined deadline period spanning at least one periodic interval between interrupt signals, and each task being associated with a count value, wherein the plurality of tasks is classified into task blocks such that each of the tasks in a respective task block can be completed within the respective predetermined deadline period for that task, wherein each task block is managed by a respective task block controller; and
   means for decrementing the count value for each task upon each generation of an interrupt signal, and for designating that a task is due to be executed when the respective count value for that task is equal to or less than zero,
   wherein switching between tasks which belong to the same task block is achieved directly within said task block by said respective task block controller and without intervention from said task switch, said task switch only performing switching when switching is done to a task that does not belong to the same task block.

5. A real-time operating system according to claim 1, wherein each count value associated with a respective task has an initial value equal to the deadline time.

6. A real-time operating system which generates an interrupt signal at periodic intervals and is capable of executing a plurality of tasks sequentially and in real time, comprising:
   a task switch; and
   a plurality of tasks, wherein the plurality of tasks is classified into task blocks each of which is managed by a respective task block controller,
   wherein switching between tasks which belong to the same task block is performed directly within said task block by said respective task block controller and without intervention from said task switch, said task switch only performing switching when switching is done to a task that does not belong to the same task block.

7. A real-time operating system according to claim 6, wherein each task has a predetermined deadline time spanning at least one periodic interval between interrupt signals, and wherein the plurality of tasks is classified into task blocks such that each of the tasks in a respective task block can be completed within the respective predetermined deadline time for that task.

8. A real-time operating system according to claim 6, wherein each respective task block controller includes a scheduler for scheduling the start of execution for each task in a respective task block, and wherein the switching between tasks within said respective task block is performed by said scheduler.

* * * * *